(12) United States Patent
Thomas et al.

(10) Patent No.: US 12,003,895 B2
(45) Date of Patent: Jun. 4, 2024

(54) SYSTEM AND METHOD FOR AUTO SELECTING A VIDEO FOR DISPLAY ON A MOBILE DEVICE BASED ON THE PROXIMITY OF THE MOBILE DEVICE RELATIVE TO THE VIDEO SOURCE

(71) Applicant: Honeywell International Inc., Charlotte, NC (US)

(72) Inventors: Manu Thomas, Pandalam (IN); Jitendra S. Chaurasia, Bengaluru (IN); Abhishek R. Sharma, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/846,722

(22) Filed: Jun. 22, 2022

(65) Prior Publication Data
US 2022/0337790 A1     Oct. 20, 2022

Related U.S. Application Data

(63) Continuation of application No. 16/891,548, filed on Jun. 3, 2020, now Pat. No. 11,394,932.

(51) Int. Cl.
*H04N 7/18*     (2006.01)
*H04N 5/232*    (2006.01)
(Continued)

(52) U.S. Cl.
CPC ............ *H04N 7/188* (2013.01); *H04N 7/181* (2013.01); *H04N 23/69* (2023.01); *H04N 23/698* (2023.01); *H04W 4/023* (2013.01)

(58) Field of Classification Search
None
See application file for complete search history.

(56) References Cited

U.S. PATENT DOCUMENTS 9,838,995 B2 *  12/2017  Baldwin ............... H04W 4/029
10,021,464 B2    7/2018  Todorovic et al.
(Continued)

FOREIGN PATENT DOCUMENTS

CN     107071358 A     8/2017
CN     107197209 A     9/2017
(Continued)

OTHER PUBLICATIONS

Ebert et al., "The Forensic Holodeck: An Immersive Display for Forensic Crime Scene Reconstructions," Forensic Science and Medicine and Pathology, 5 pages, Oct. 2014.

*Primary Examiner* — Edemio Navas, Jr.
(74) *Attorney, Agent, or Firm* — Seager, Tufte & Wickhem, LLP

(57) ABSTRACT

Devices, methods, and systems for monitoring captured images and/or video from one or more cameras are described herein. The systems may include one or more cameras, a video recorder, a mobile display device, and a location detection system. The location detection system may detect a proximity of the mobile display device relative to one or more cameras and determine when the proximity to a camera meets a predetermine proximity criteria. The mobile display device may display at least part of a recorded video stream that is captured by the camera when it is determined the proximity of the mobile display device to the camera meets the predetermined proximity criteria. In some cases, the displayed video may be displayed in a virtual reality or three dimensional format. Further, as the proximity of the mobile display device to the camera changes, a zoom level and/or direction of view of the displayed video may change.

15 Claims, 7 Drawing Sheets

(51) Int. Cl.
*H04N 23/69* (2023.01)
*H04N 23/698* (2023.01)
*H04W 4/02* (2018.01)

(56) References Cited

U.S. PATENT DOCUMENTS

| | | | |
|---|---|---|---|
| 10,432,970 | B1 | 10/2019 | Phillips et al. |
| 10,504,348 | B2 * | 12/2019 | Kerzner ............. G08B 13/1963 |
| 11,074,460 | B1 * | 7/2021 | Hodges ............... G06F 3/04855 |
| 2015/0026574 | A1 * | 1/2015 | Dow ........................ G06F 9/451 |
| | | | 715/719 |
| 2016/0092056 | A1 | 3/2016 | Yang et al. |
| 2016/0381440 | A1 * | 12/2016 | Davis ....................... H04Q 9/00 |
| | | | 340/870.02 |
| 2017/0013207 | A1 | 1/2017 | Manku |
| 2017/0277785 | A1 * | 9/2017 | Burke ...................... H04N 7/18 |
| 2018/0077451 | A1 | 3/2018 | Yip et al. |
| 2018/0199075 | A1 | 7/2018 | Wang et al. |
| 2019/0304276 | A1 | 10/2019 | Lee et al. |
| 2020/0082851 | A1 | 3/2020 | Chau et al. |
| 2021/0071855 | A1 * | 3/2021 | Pan ..................... H05B 47/165 |

FOREIGN PATENT DOCUMENTS

| | | |
|---|---|---|
| EP | 3419301 A1 | 12/2018 |
| WO | 2016033452 A1 | 3/2016 |
| WO | 2017142355 A1 | 8/2017 |
| WO | 2018227098 A1 | 12/2018 |

\* cited by examiner

SYSTEM AND METHOD FOR AUTO SELECTING A VIDEO FOR DISPLAY ON A MOBILE DEVICE BASED ON THE PROXIMITY OF THE MOBILE DEVICE RELATIVE TO THE VIDEO SOURCE

This is a continuation of co-pending U.S. patent application Ser. No. 16/891,548, filed Jun. 3, 2020, and entitled "VIDEO MONITORING SYSTEMS AND METHODS", which is incorporated herein by reference.

TECHNICAL FIELD

The present disclosure relates generally to devices, methods, and systems for monitoring video captured by one or more cameras. More particularly, the present disclosure relates to devices, methods, and system for monitoring video captured and recoded by a network of cameras.

BACKGROUND

Surveillance systems are often deployed to enhance the security of a facility. Such surveillance systems often include a number of remote video cameras distributed throughout the facility. The video streams from the various remote cameras are often recorded and made available for viewing by security personnel at a central monitoring station. While such systems are suitable for capturing and storing video of security events with the facility, they are not ideal for facilitating subsequent investigation of such security events.

SUMMARY

The present disclosure generally relates to monitoring video captured by one or more video cameras in a facility, and more particularly, to monitoring video captured by one or more video cameras in a facility in a manner that facilitates subsequent investigation of one or more security events that occurred in the facility.

In one example, a surveillance system may include one or more video cameras each producing a video stream, a video recorder operatively coupled to the one or more video cameras for recording each of the video streams produced by the one or more video cameras, a mobile display device operatively coupled to the video recorder, and a location detection system configured to determine which of the one or more video cameras has a predetermined geo-location relative to the mobile display device. The mobile display device may be configured to display at least part of the recorded video stream that is captured by the video camera that is determined to have the predetermined geo-location relative to the mobile display device.

This may allow security personnel to go directly to the location where the incident happened, view the physical space with their own eyes, and also view the video recording that was captured by the video camera at that location. This may help the security personnel better investigate the incident.

In another example configuration, a method of displaying video of an area monitored by one or more video cameras may be provided. The method may include detecting a proximity of a mobile display device relative to a video camera of the one or more video cameras and determining when the proximity of the mobile display device relative to the video camera meets a predetermined proximity criteria. The method may further include displaying on the mobile display device a video stream captured by the video camera of the one or more video cameras when the proximity of the mobile display device relative to the video camera meets the predetermined proximity criteria.

In a further example configuration, a method of monitoring a surveillance system may be provided. The method may include capturing video streams with a plurality of video cameras spaced from one another in a predetermined area, storing the video streams captured by the plurality of video cameras in a memory, receiving an indication that a mobile display device is within a predetermined distance from a video camera of the plurality of video cameras, and providing a video feed from the video camera to the mobile display device.

DESCRIPTION

The present system and approach may incorporate one or more processors, computers, controllers, user interfaces, wireless and/or wire connections, and/or the like, in an implementation described and/or shown.

Buildings and/or other areas are often monitored by one or more video cameras (e.g., one or more closed-circuit television cameras and/or other surveillance cameras), which may or may not be part of a network of video cameras. In some cases, the video cameras, may be part of a surveillance system. Video captured by the one or more video cameras may be recorded in one or more databases for viewing at a later time. In some cases, the video recordings captured by the one or more cameras may be viewed in real time and/or at a later time at a central monitoring station and/or at one or more other suitable locations remote from the areas monitored by the one or more video cameras.

When an incident occurs at a location, a conventional approach of investigating the incident may be to look into the incident at the location at some time after the incident occurred. In instances when the location and/or surrounding areas are monitored by a surveillance system, video recordings of the location and/or the surrounding areas may be reviewed. Typically, the video recordings may be reviewed at one or more locations remote from the location at which the incident occurred (e.g., offsite or in a room remote from the location at which the incident occurred). As a result, it may be difficult for investigators to investigate the incident because a location at which the investigator is reviewing video of the incident is remote from the incident location being analyzed, resulting in limited ability to compare the location post-incident in person to the location before and/or during the incident captured on video.

To facilitate allowing viewers of video captured by cameras of a surveillance system to compare what is in the captured video to a current physical scene or area captured in the video, a surveillance system may be configured to send video captured by a camera to a mobile display device based on a proximity of the mobile display device to the camera, as discussed in greater detail herein. When the surveillance system includes a plurality of cameras, the surveillance system may be configured to send images and/or video recorded by a camera that is nearest the mobile display device view viewing on the mobile device.

Figure 1:
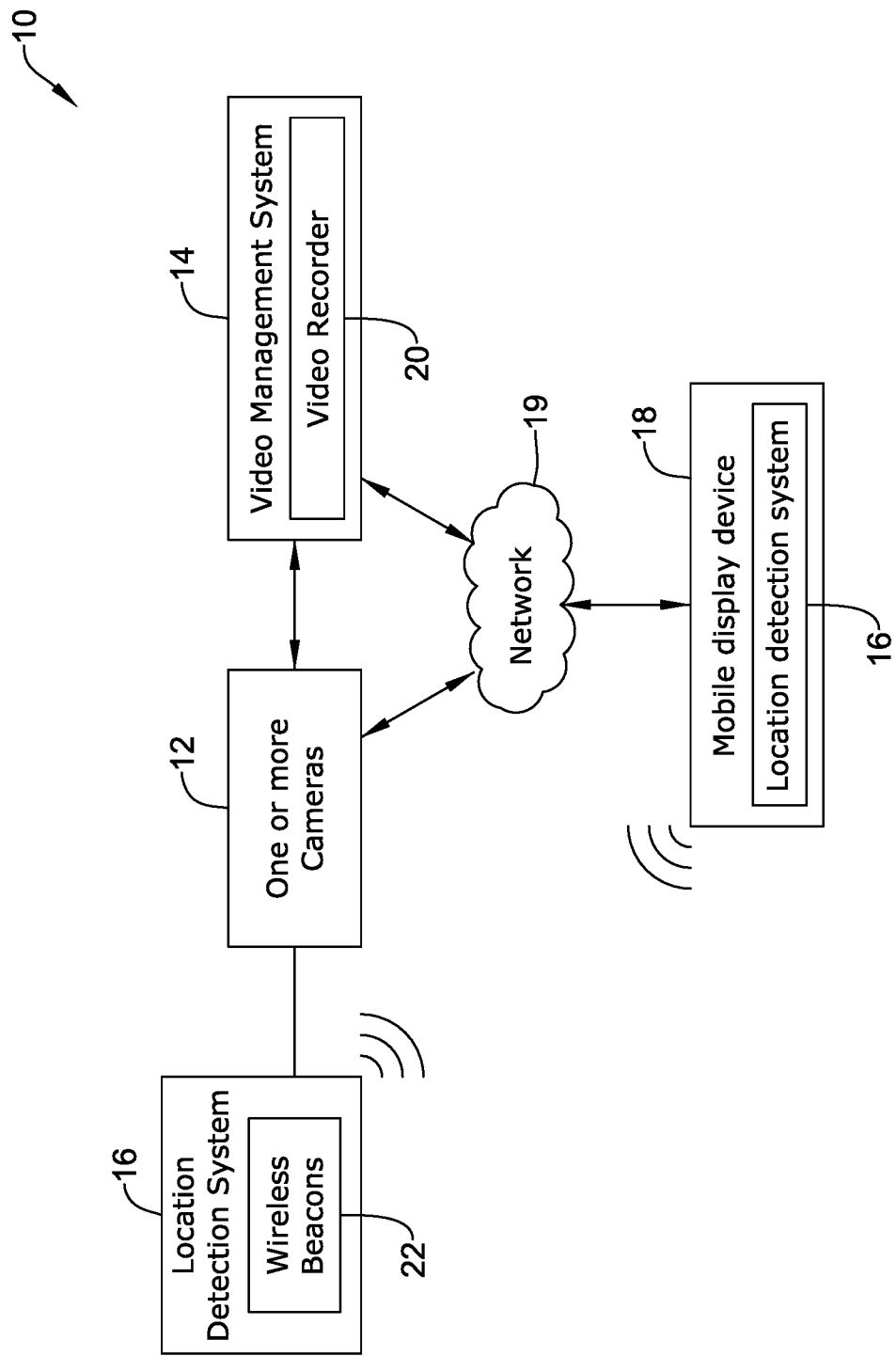
FIG. 1 is schematic block diagram of an illustrative surveillance system.

Turning to the Figures, FIG. 1 depicts an illustrative surveillance system 10. The illustrative surveillance system 10 may include one or more cameras 12 (e.g., video cameras), a video management system 14, and a location detection system 16. The surveillance system 10 may include additional and/or alternative suitable components. In some cases, the surveillance system 10 may include a mobile display device 18, but this is not required and the mobile display device 18 may be separate from the surveillance system 10 and may communicate with one or more components of the surveillance system 10. The cameras 12, the video management system 14, the location detection system 16, the mobile display device 18, and/or other suitable components of the surveillance system 10 may be and/or may include one or more computing devices.

The components of the surveillance system 10 may be configured to communicate with one another over one or more wired and/or wireless networks (e.g., network 19). In operation, the one or more cameras 12, the video management system 14, and the mobile display device 18 may communicate over the networks 19 to facilitate recording and/or monitoring video feeds or streams from the one or more cameras 12, to pass data from the one or more cameras 12 to the video management system 14 and/or the mobile display device 18, provide software updates to the one or more cameras 12 and/or the mobile display device 18, provide control instructions/signals to and/or between the one or more cameras 12, the video management system 14, and the mobile display device 18, and/or communicate other suitable data, instructions, and/or information among the one or more cameras 12, the video management system 14, and the mobile display device 18.

The network 19 may be and/or may include any suitable types of networks configured to facilitate communication between two or more computing devices. Examples of such a network types may include a distributed computing environment (e.g., a cloud computing environment), a wide area network (WAN) (e.g., the Internet), a local area network (LAN), a personal area network (PAN), a campus area network (CAN), or metropolitan area network (MAN), among other types of network relationships. The communications over the network 19 and between computing devices may traverse through a firewall, but this is not required. Further, although not illustrated in FIG. 1 for simplicity and so as not to obscure embodiments of the present disclosure, one or more gateway devices may be utilized to facilitate communication over the network(s) 19.

The one or more cameras 12 may be any suitable type of image and/or video capturing cameras configured to capture and/or create video of a predetermined area. In some cases, one or more of the one or more cameras 12 may be pan-tilt-zoom (PTZ) cameras, still cameras, 360 degree-view cameras, and/or other cameras 12 suitable for surveillance purposes and/or other suitable purposes. In some cases, one or more cameras 12 may be or may include a computing device configured to facilitate capturing video of the predetermined area and/or monitoring captured video.

The video management system 14 may be configured to manage, among other data, video data recorded by the one or more cameras 12 of the surveillance system 10. In some cases, the video management system 14 may include one or more video recorders 20 (e.g., one or more network video recorders (NVRs) and/or other suitable video recorders) operably coupled to the one or more cameras 12 and configured to record, store, and provide video data (e.g., video feeds and/or video streams) produced by and/or received from the one or more cameras 12. The video recorders 20 may be operably coupled to the mobile display device 18 to facilitate providing video to the mobile display device 18. For example, in response to communication from the location detection system 16, the video management system 14 may cause video to be provided to the mobile display device 18. The video recorders 20 may be a computing device and may include on one or more processors and memory for storing video data and/or instructions executable by the one or more processors.

The video management system 14 may be and/or may include a server. When provided, the server may be any suitable type of server configured to communicate with the one or more cameras 12 and/or the mobile display device 18. The server may be located in a same or different building than one or more of the cameras 12 and/or the mobile display device 18. In some cases, the server may be considered remote in that it may connect over a wired or wireless network to one or more of the cameras 12 and/or the mobile display device 18.

The server may be configured to receive captured video from the one or more cameras 12 and store the received video in memory. The server may be configured to send received and/or stored video to the mobile display device 18 upon a request from the mobile display device 18 and/or the location detection system 16 and/or facilitate the mobile display device 18 receiving video associated with one or more cameras 12.

The location detection system 16 may be configured to determine relative positions of the mobile display device 18 and the one or more cameras 12 (e.g., positions of the cameras 12 relative to the mobile display device 18). In one example, the location detection system 16 may be configured to determine whether the one or more cameras 12 has a predetermined geo-location relative to the mobile display device 18. A geo-location of a computing device (e.g. cameras 12) relative to another computing device (e.g. mobile display device 18) may take into account one or more factors including, but not limited to, a distance between the computing devices or users of devices, a direction one or more of the computing devices or users of computing devices are facing (e.g., with respect to one another and/or otherwise), rooms or building in which one or more of the computing devices or users of computing devices are located, locations of the computing devices or users of computing devices relative to an incident location, and/or one or more other suitable factors. The location detection system 16 may utilize an average (e.g., a weighted average or other suitable average) of one or more factors and/or other suitable selection of one or more factors to establish a geo-location of one or more computing devices (e.g., cameras 12) relative to another computing device (e.g., the mobile display device 18). In some cases, a computing device having a predetermined geo-location relative to another computing device may indicate the computing device's geo-location relative to other computing device may be within a threshold geo-location value, for example.

A geo-location of a device relative to another device and/or predetermine geo-locations may be utilized to determine from which camera 12 to play or display video on the mobile display device 18. In one example, an office space may have a plurality of cameras 12 and the plurality of cameras 12 may include a first camera 12 in a hallway and a second camera 12 in an office. A user may be carrying the mobile display device 18 and may be in the hallway facing into the office and nearer the first camera 12 in the hallway. Using the geo-locations of the first and second cameras 12 relative to the mobile display device 18 may allow the location detection system 16 to determine that the second camera 12, but not the closer, first camera 12, has a predetermined geo-location with the mobile display device 18 based on a proximity of the first and a second cameras 12 relative to the mobile display device 18, rooms and/or spaces in which the first and second cameras 12 and the mobile display device 18 are located, and a direction the mobile display device 18 and/or a user of the mobile display device 18 is facing relative to the first and second cameras 12. These and/or other factors may be considered. Once it is determined the second camera 12 has the predetermined geo-location relative to the mobile display device 18, the location detection system 16 may communicate with the video management system 14 and the video management system 14 may send video captured by the second camera 12 (e.g., live video or video recorded on the video recorders 20) to the mobile display device 18 for displaying thereon and viewing. In some cases, recorded video that corresponds to a time period of when an identified incident occurred may be displayed on the mobile display device 18.

The location detection system 16 may be configured from a combination of software and/or hardware and may be located on one or more components of the surveillance system 10. In some cases, the location detection system 16 may identify and compare GPS coordinates of the cameras and the mobile display device 18. Alternatively, or in addition, the location detection system 16 may include one or more beacons 22 configured to facilitate the location detection system 16 in determining locations of the cameras 12 relative to the mobile display device 18. In some cases, the beacons 22 may be provided with or adjacent each of the cameras 12 to facilitate determining positioning of the cameras 12 relative to the mobile display device 18. Alternatively or additionally, the one or more beacons 22 may be located at predetermined locations relative to the cameras so as to determine positioning of the cameras 12 relative to the mobile display device 18 via triangulation or other suitable location detection technique.

The beacons 22 may be devices capable of direct wireless communication with the mobile display device 18, and may facilitate the determination of the location of the cameras 12 relative to the mobile display device 18. For example, respective beacons 22 of two or more beacons 22 in a network may each have a different predetermined location relative to the cameras 12, and can communicate with the mobile display device 18 when the mobile display device 18 is within a particular proximity (e.g., range) of the beacon 22 such that the location detection system 16 may determine the location of the cameras 12 relative to the mobile display device 18 based on the communications (e.g., signal strength or other data) it is receiving from the beacon(s) 22 and/or the mobile display device 18. In one example, the location detection system 16 may be configured to determine a relative location of the beacons 22, and hence the cameras 12 relative to the mobile display device 18, based on the predetermined locations for each beacon 22 and camera 12, and the signal strength between the beacon(s) 22 and the mobile display device 18. The beacons 22 may be, for example, Bluetooth beacons that can communicate with the mobile display device 18 via Bluetooth Low Energy (BLE) technology (e.g., as an iBeacon), but this is just one example. WiFi signal strength may also be used.

The location detection system 16 may be distributed across two or more suitable locations of the surveillance system 10. For example, the location detection system 16 may include one or more beacons 22 associated with the cameras 12. In some cases, a portion of the location detection system 16 may be located on the mobile display device 18. For example, the mobile display device 18 may include a transceiver configured to communicate with the one or more beacons 22 and/or software for determining locations of the cameras 12 relative to the mobile display device 18. In some cases, a portion of the location detection system 16 may be hosted by the video management system 14. For example, the video management system 14 may be configured to receive proximity information and calculate a proximity of various cameras 12 to the mobile display device 18, a geo-location of the cameras 12 relative to the mobile display device 18, and/or other suitable parameters.

Figure 2:
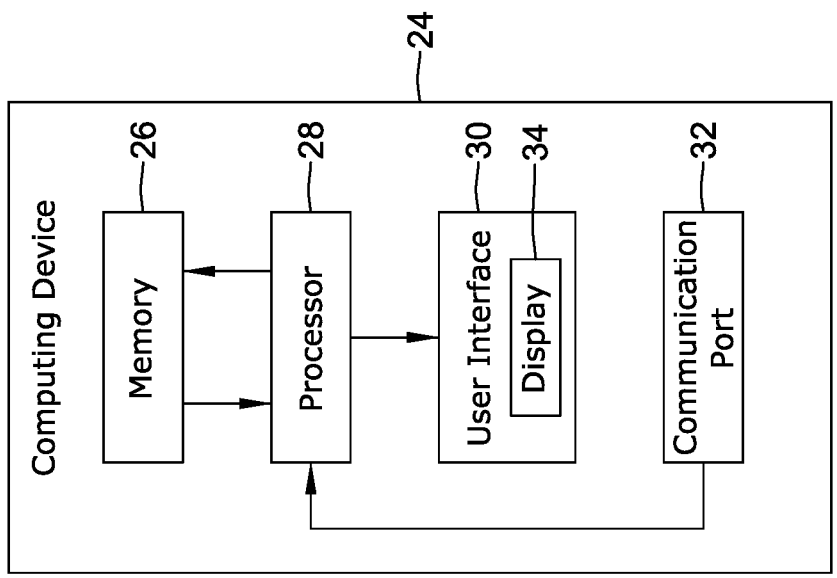
FIG. 2 is a schematic block diagram of an illustrative computing device.

FIG. 2 illustrates an example of a computing device 24 that may be or may be included in the computing devices discussed herein. The computing device 24 may represent all or part of one or more of the cameras 12, the mobile display device 18, the video management system 14 and/or location detection system 16 of FIG. 1. The computing device 24 may be and/or may be part of, for instance, a smart phone, a tablet, a personal digital assistant (PDA), a personal computer, a beacon, a camera, a display device, a video recorder, a network component, and/or other suitable computing device. However, configurations of the present disclosure are not limited to a particular type of computing device 24. In some cases, the computing device 24 may include memory 26, one or more processors 28, one or more user interfaces 30, one or more communication ports 32, and/or one or more other suitable computing components.

As shown in FIG. 2, the computing device 24 may include memory 26 and a processor 28 that may communicate with one another such that the processor 28 may execute instructions (e.g., application program code of a mobile application or software, among other instructions) stored on the memory 26. The computing device 24 may further include a user interface 30, a communications port 32, and/or one or more other suitable components.

The memory 26 may be any type of storage medium that can be accessed by the processor 28 to perform various examples of the present disclosure. For example, the memory 26 may be a non-transitory computer readable medium having computer readable instructions (e.g., computer or application program instructions) stored thereon that are executable by the processor 28 for performing one or more methods or techniques described herein.

The memory 26 may be may be volatile or nonvolatile memory. The memory 26 may also be removable (e.g., portable) memory, or non-removable (e.g., internal) memory. For example, the memory 26 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although the memory 26 is illustrated as being located in the computing device 24, embodiments of the present disclosure are not so limited. For example, the memory 26 may also be located internal to another computing resource (e.g., enabling computer readable instructions to be downloaded over the Internet or another wired or wireless connection).

The processor 28 of the computing device 24 may include a single processor or more than one processor working individually or with one another (e.g., dual-core, etc.). The processor 28 may be configured to execute instructions, including instructions that may be loaded into the memory 26 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The user interface 30, when provided, may be any suitable user interface and/or user interface components configured to facilitate a user of the computing device 24 interacting with the computing device 24 via the user interface 30. For example, the user interface 30 may be used to provide information to and receive information from the user of the computing device 24. For instance, the user interface 30 may receive selections of dates and times for video captured by the cameras 12 and display one or more video feeds from one or more cameras for a selected date and time. The user interface 30 may include a keyboard or keyboard functionality, a pointer (e.g., a mouse, touch pad, or touch ball) or pointer functionality, a microphone, a speaker, a light system, a haptic system, a camera, a video camera, and/or other suitable user interface features the user may use to input information into and/or receive information from the computing device 24. Configurations of the present disclosure, however, are not limited to a particular type(s) of user interface 30.

In some cases, the user interface 30 may include a graphical user interface (GUI) that may have a display 34 (e.g., a screen) that may provide and/or receive information to and/or from the user of the computing device 24. The display 34 may be, for instance, a touch-screen (e.g., the GUI may include touch-screen capabilities).

The communications port 32 may be any type of communication port(s) and may facilitate wired and/or wireless communication with one or more networks. In one example, the communications port 32 may facilitate communication with one or more networks and/or other devices (e.g., beacons, other computing devices, mobile devices, servers, and/or other suitable devices) through any suitable connection including, but not limited to, radio communication, Ethernet, cellular communication, ZigBee, REDLINK™, Bluetooth, Bluetooth Low Energy (BLE), WiFi, IrDA, dedicated short range communication (DSRC), EnOcean, Near Field Communication (NFC), and/or any other suitable common or proprietary wired or wireless protocol. In one example, the communications port 32 may at least include a port configured to communicate over a Bluetooth connection with one or more beacons 22, cameras 12, and/or the network 19.

Figure 3:
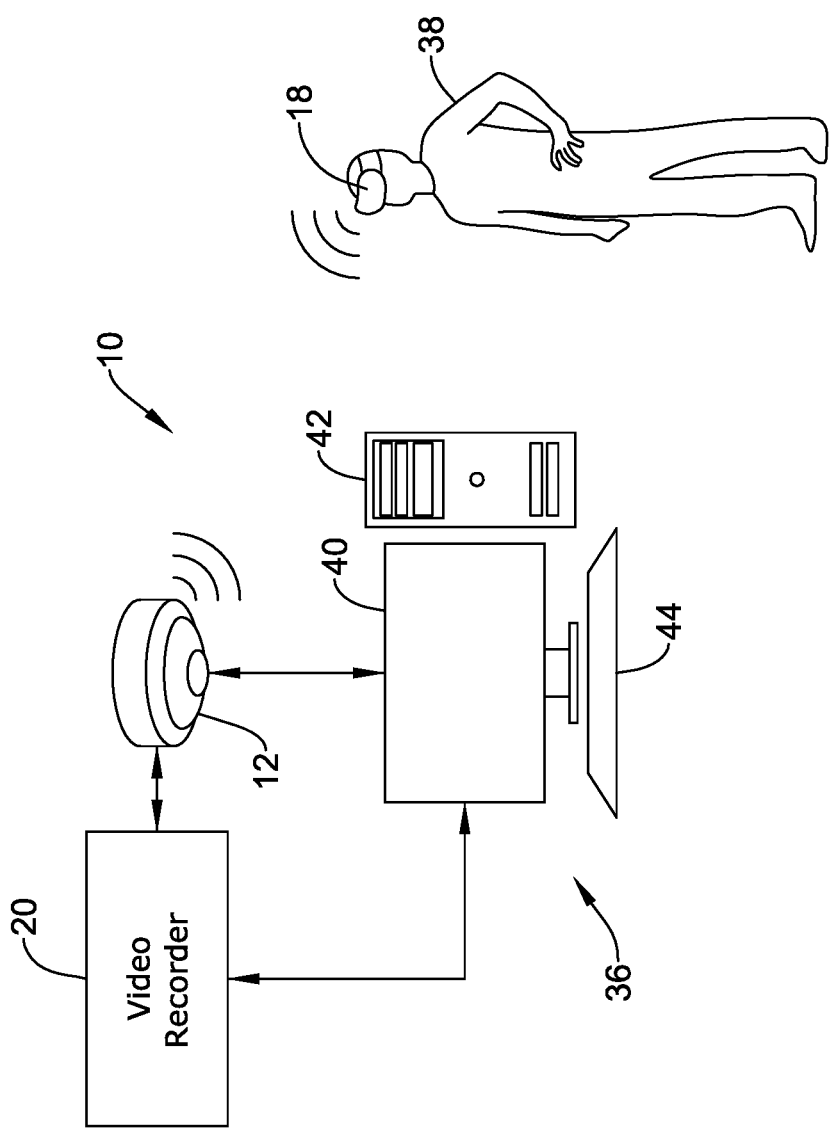
FIG. 3 is a schematic block diagram of an illustrative surveillance system with a user wearing or otherwise carrying a mobile display device.

FIG. 3 is a schematic illustration of the illustrative surveillance system 10. In this example, the illustrative surveillance system 10 includes a work station 36 and the mobile display device 18 is work or carried by a user 38. The work station 36 may be in communication with the video recorder 20 and the camera 12 via one or more networks. Although not depicted in FIG. 3, the surveillance system 10 may include a beacon 22, which may be located within the camera 12 and/or at a known geolocation relative to or a known distance from the camera 12. Among other components, the work station 36 may include a display 40, a desktop computer 42, and one or more user input components 44 (e.g., a keyboard or key pad, a mouse, a track pad, etc.). The work station 36 and/or the video recorder 20 may be located remote from the camera 12, but this is not required. In one example, the video recorder 20 may be located in the Cloud and/or on computing devices in a video storage space in a same or different room than a room having a space monitored by the camera 12. Similarly, the work station 36 may be located at a space in a same or different room than the room having the space monitored by the camera 12.

In operation, the camera 12 may record video of a scene within view of the camera 12 and provide the video via a video feed or video stream to the work station 36 and/or the video recorder. In some cases, a live feed from the camera 12 may be provided to the work station 36 and the video may be saved in the video recorder 20 via the work station 36 or directly from the camera 12. Alternatively, the live feed from the camera 12 may be provided to the video recorder 20, which then provides the live feed to the work station automatically and/or on demand. These are just examples.

As depicted in FIG. 3, the user 38 may wear the mobile display device 18 (e.g., a virtual reality headset and/or other suitable mobile display device). The user may approach the camera 12 and the proximity of the mobile display device 18 and/or the user 38 may cause one or more video streams or video feeds from the camera 12 to be provided to and/or displayed on the mobile display device 18 by the video management system 14. In some cases, a user may select via the mobile display device 18 and/or other computing device in communication with one or both of the mobile display device and the surveillance system 10 to a date and/or time for playing back video feeds or video streams captured by the surveillance system 10. This may correspond to a time window during which an incident occurred. Then, as the user 38 and/or the mobile display device 18 approach the camera 12 and/or one or more other suitable cameras of the surveillance system 10, video from the camera 12 being approached or otherwise having a predetermined geo-location relative to the user 38 and/or the mobile display device 18 and for the selected date and time may be displayed on the mobile display device 18. The video feed or video stream may be provided to the mobile display device 18 by the video management system 14 via the Cloud, via the camera 12, and/or via one or more other computing device having access to the video captured by the camera and capable of communicating with the mobile display device 18 in response to the location detection system determining a predetermined geo-location between the camera 12 and the mobile display device 18 and/or the user 38.

In some cases, a zoom level of the video stream or video feed displayed on the mobile display device may change as the geo-location of the mobile display device 18 and/or the user 38 relative to the camera 12 changes. In one example, as the mobile display device 18 and/or the user 38 move farther away from the location of camera 12, the zoom level may increase to simulate getting closer to an object displayed in the mobile display device 18. Similarly, as the mobile display device 18 and/or the user 38 move closer to the location of camera 12, the zoom level may decrease to simulate getting farther away from an object displayed on the mobile display device 18. Alternative, or in addition, in some cases, the video stream may be captured by a 360 degree-view camera. When so provided, as the mobile display device 18 and/or the user 38 rotate around, the portion of the 360 degree-view that is displayed on the mobile display device 18 may also rotate to simulate the user looking in different directions within the space. These features may help provide a virtual reality experience to the user.

Figure 4:
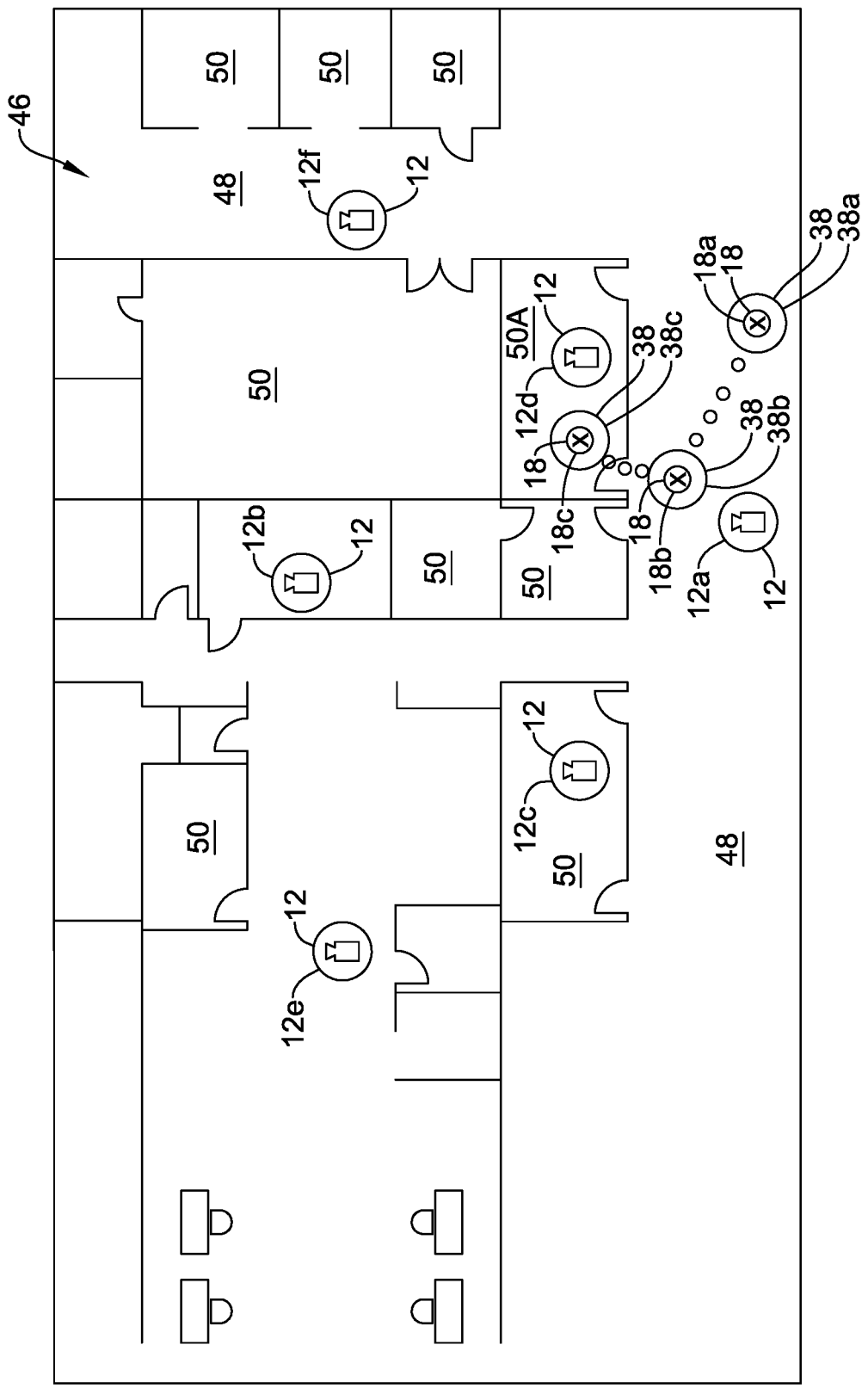
FIG. 4 is a schematic diagram of an illustrative floor plan for a space monitored by one or more cameras with a user traversing through the floor plan.

FIG. 4 depicts an illustrative plan view of an office space 46 with hallways 48 and conference rooms 50. As depicted, the office space 46 may include cameras 12 of the surveillance system 10. Although any suitable number of cameras 12 may be utilized, in one example, the office space 46 may include 6 cameras including, but not limited to, a first camera 12a located in the hallway 48, a second camera 12b located in a conference room 50, a third camera 12c located in a conference room 50, fourth camera 12d located in a conference room 50, a fifth camera 12e located in another hallway 48, and a sixth camera 12f located in a further hallway 48. Although the camera icons 12 may be numbered, the numbers used herein (e.g., first, second, third, fourth, fifth, sixth) are used for convenience and clarity and any camera icon 12 may be given any suitable number or designation.

In the example depicted in FIG. 4, the user 38 having the mobile display device 18 is shown traversing through the office space 46 to three different locations within the office space 46. A first location 38a of the user 38 (18a of the mobile display device 18) may be in the hallway 48 adjacent the first camera 12a. A second location 38b of the user 38 (18b of the mobile display device 18) may be at a doorway to a conference room 50A, where the user is facing into the conference room 50A. A third location 38c of the user 38 (18c the mobile display device 18) may be in the conference room 50A. The dots between locations of the user 38 (and/or the mobile display device 18) may represent a path the user traverses between these locations.

If the location detection system 16 determines the first camera 12a has a predetermined geo-location (e.g., is within a threshold distance and/or satisfies other criteria) relative to the user 38 and/or the mobile display device 18 when the user 38 and/or the mobile display device 18 are at the first location 38a, at least part of a video stream (e.g., at least a segment of a live video stream or a recorded video stream) captured by the first camera 12a may be provided to the mobile display device 18 over a network (e.g., a LAN and/or WAN) from the first camera 12a and/or one or more storage components (e.g., the video recorder 20, a server, etc.). In some cases, the location detection system 16 may be configured to detect movement of the user 38 and/or the mobile display device 18 and adjust the video provided to the mobile display device 18 accordingly. For example (e.g., when the mobile display device 18 may be a virtual reality headset and/or in other instances), the location detection system 16 may be configured to determine (e.g., based on tracking of the user 38 and/or the mobile display device 18, accelerometer readings from the mobile display device 18, gyroscope readings from the mobile display device 18, and/or other suitable data) a direction the user 38 is most likely facing and then, based on the determined direction of the user, cause the video management system 14 to provide video to and to be displayed on the mobile display device 18 that is video of a scene that is in front of the user 38. In another example, the location detection system 16 may be configured to determine a distance of the user 38 and/or the mobile display device 18 from the first camera 12a and cause the video management system 14 to automatically adjust a zoom level of the video provided to and displayed on the mobile display device 18 based on the distance of the user 38 and/or the mobile display device 18 from the first camera 12a (e.g., as the user 38 and/or the mobile display device 18 get closer to a camera 12, the video may zoom out and as the user 38 and/or the mobile display device 18 get farther away from a camera 12, the video may zoon in).

As the user 38 and/or the mobile display device 18 traverse toward the second location 38b, the location detection system 16 may adjust determinations regarding geo-locations of the cameras 12 relative to the user 38 and/or the mobile display device 18. For example, not only may the viewing direction and/or zoom level of the video feed to the mobile display device 18 change as the user and/or the mobile display device move, but the video sent to and displayed on the mobile display device 18 may switch from the first camera 12a to one or more other cameras 12 based on geo-locations of the cameras 12 relative to the user 38 and/or the mobile display device 18. In one example, as the user 38 and the mobile display device 18 arrive at the second location 38b from the first location 38a, the location detection system 16 may make an updated determination that the fourth camera 12d located in the conference room 50A has the predetermined geo-location relative to the user 38 and/or the mobile display device 18 and cause the video management system 14 to provide a video feed captured by the fourth camera 12d and having an appropriate viewing direction and/or zoom level for displaying on the mobile display device 18 in response to the updated determination. In some cases, the updated determination may be based, at least in part, on a proximity of the user 38 and/or the mobile display device 18 relative to the first camera 12a and the fourth camera 12d, a direction in which the user 38 and/or the mobile display device traversed, a direction in which the user 38 and/or the mobile display device 18 are facing, a type of the relevant cameras (e.g., 360 degree, pan tilt zoom (PTZ), fixed, etc.), and/or one or more other suitable factors.

As the user 38 and/or the mobile display device 18 traverse toward the third location 38c, the location detection system 16 may adjust determinations regarding geo-locations of the cameras 12 relative to the user 38 and/or the mobile display device 18. For example, the location detection system 16 may cause the video management system 14 to change the viewing direction and/or zoom level of the video feed to the mobile display device 18 based on a relative location of fourth camera 12d relative to the user 38 and/or the mobile display device 18 at the third location 38c. Further, as the user 38 and/or the mobile display device 18 move about the conference room 50A and/or the office space 46, further determinations may be made by the location detection system 16 and further adjustments may be made to the video provided to and/or displayed on the mobile display device 18.

Figure 5:
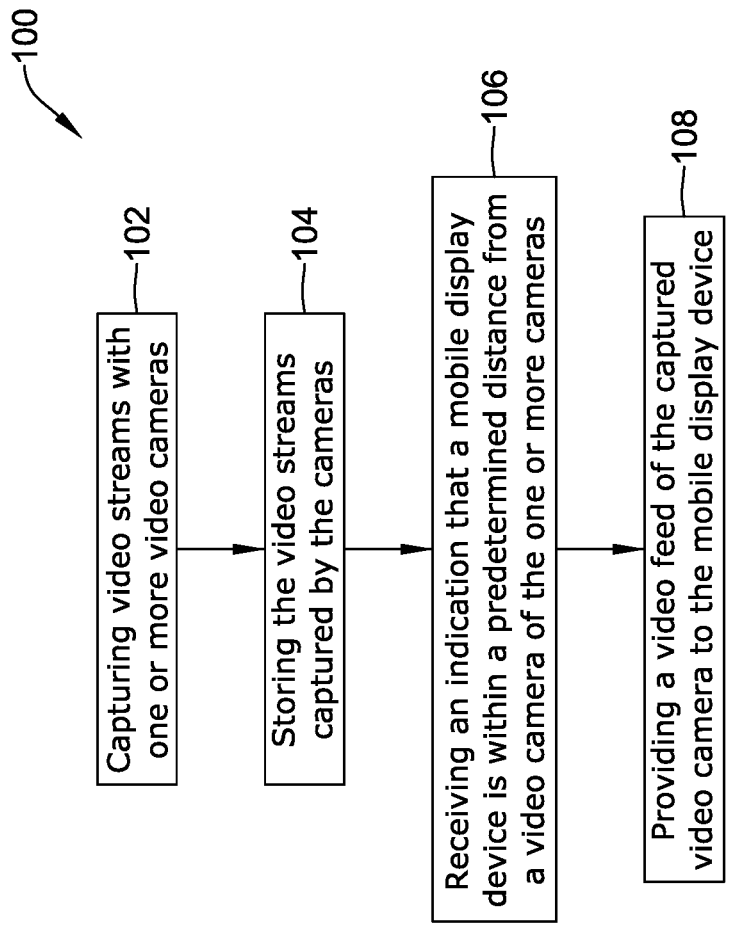
FIG. 5 is a schematic flow diagram of an illustrative method for providing a video feed of captured video to a mobile display device.

FIG. 5 is a schematic flow diagram of an illustrative method 100 for providing video feeds from video cameras (e.g., the cameras 12 and/or other suitable cameras) to mobile display devices (e.g., the mobile display device 18 and/or other suitable mobile display devices). The method 100 may include capturing 102 video streams with one or more video cameras observing scenes of a space and storing 104 the video streams captured by the video cameras. The video captured may be captured by a 360-degree camera and/or one or more other suitable types of cameras. The captured video may be stored in any suitable storage mechanism including, but not limited to, memory (e.g., the memory 26 and/or other suitable memory) of a computing device (e.g., the computing device 24 and/or other suitable computing device). In some cases, the captured video may be stored at the video camera, on a network video recorder (e.g., the video recorder 20 and/or other suitable video recorder), on a remote server, and/or other suitable computing device having a tangible storage medium and is in communication with the video camera over one or more networks.

The method 100 may include receiving 106 an indication that a mobile display device is within a predetermined distance from a video camera of the one or more cameras capturing video of one or more scenes. The indication may be received at the surveillance system (e.g., the surveillance system 10 and/or other suitable surveillance system) and may be determined by a location detection system (e.g., the location detection system 16 and/or other suitable location detection system). In one example, the location detection system may determine the video camera is within a predetermined geo-location of the mobile display device, but this is not required. In some cases, the location may be determined by the location detection system by sending signals between beacons (e.g., the beacons 22 and/or other suitable beacons) associated with the video cameras and the mobile display devices and using known location detection techniques based on the signals or communications between the beacons and the mobile display devices. The indication that the mobile display device is within a predetermined distance from a video camera may be received at a controller or processor of the surveillance system and/or at the video recorder.

In response to receiving the indication that the mobile display device is within a predetermined distance from the video camera, a video feed captured by the video camera may be provided 108 to the mobile display device by a video management system (e.g., the video management system 14 and/or other suitable video management system. In some cases, and although not required, an angle and/or zoom level of the video in the video stream provided to the mobile display device may be adjusted (e.g., automatically adjusted) based on movement of and/or an orientation of the mobile display device and/or a user of the mobile display device relative to the video camera that captured the video provided to the mobile display device, similar to as discussed herein.

Figure 6:
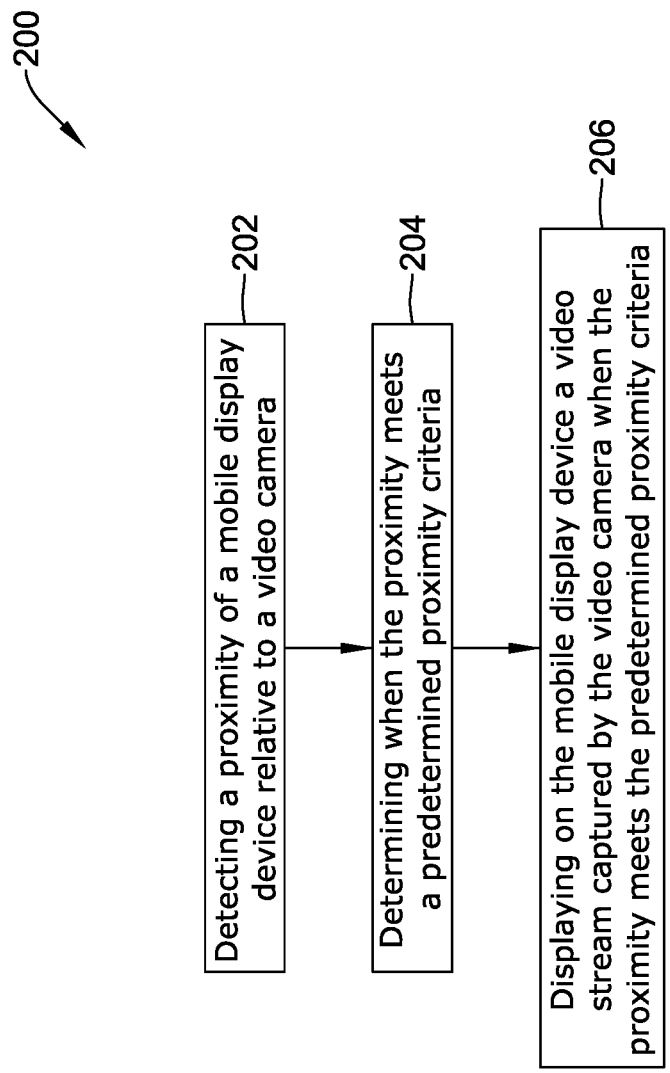
FIG. 6 is a schematic flow diagram of an illustrative method of detecting a proximity of a mobile display device and providing a video stream to the mobile display device.

FIG. 6 is a schematic flow diagram of an illustrative method 200 for providing a video stream to and displaying the video stream on a mobile display device (e.g., the mobile display device 18 and/or one or more other suitable mobile display devices). Although FIG. 6 depicts one example technique for providing the video stream to and displaying the video stream on the mobile display device, other suitable techniques are contemplated.

The method 200 may include detecting 202 a proximity (e.g., detecting a geo-location) of the mobile display device to one or more video cameras (e.g., the cameras 12 and/or other suitable cameras) of a surveillance system (e.g., the surveillance system 10 and/or other suitable system with cameras) that monitor a space. In some cases, one or more beacons (e.g., the beacon 22 and/or other suitable beacons) may be utilized to communicate wireless signals to the mobile display device to facilitate detecting 202 or determining a location of the mobile display device in the space relative to the cameras monitoring the space. The beacons may be located in the cameras and/or a known distance (e.g., a known geo-location) from the camera such that a distance between the video cameras and the mobile display device may be detected and/or determined by a location detection system (e.g., the location detection system 16 and/or other suitable location detection system) based determined distances between the beacons and the mobile display devices.

The location detection system may be configured to determine locations of the mobile display devices within a space relative to the video cameras and thus, a proximity of the mobile display devices relative to the video camera, using any suitable location detection technique. In one example, the proximity of mobile display device relative to one or more video cameras may include determining a distance between the mobile display device and the one or more video cameras via a triangulation technique, but this is not required. Further, additional and/or alternative positional information may be determined when detecting a proximity of the mobile display device relative to the one or more video cameras including, but not limited to, speed of movement of the mobile display device relative to the one or more cameras, direction of movement of the mobile display device relative to the one or more cameras, direction of a user (e.g., the user 38 and/or other suitable user) of the mobile display device relative to the one or more video cameras, and/or one or more other suitable positional or proximity information.

Once the proximity information of the mobile display device relative to the one or more video cameras has been determined and/or as the proximity information is being determined, it may be determined 204 when the proximity of the mobile display device meets a predetermined proximity criteria (e.g., a predetermined geo-location and/or other suitable predetermined proximity criteria). In one example, the predetermined proximity criteria may include a threshold distance from the one or more cameras and the proximity may be determined by the location detection system or other suitable system (e.g., a video management system such as the video management system 14) to be within the predetermined proximity criteria when a distance between a video camera and the mobile display device is less than the threshold distance. Additionally or alternatively, the predetermined proximity criteria may include one or more other suitable criteria including threshold values for speed of movement of the mobile display device relative to the one or more cameras, direction of movement of the mobile display device relative to the one or more cameras, direction of a user (e.g., the user 38 and/or other suitable user) of the mobile display device relative to the one or more cameras, and/or one or more other suitable positional or proximity information. When the predetermined proximity criteria is based on two or more criteria, the predetermined proximity criteria may be a resulting value of a function of the two or more criteria and each criteria may have a weight assigned thereto in the function, where the weight may be adjustable. Alternatively or in addition, when the predetermined proximity criteria is based on two or more criteria, the predetermined proximity criteria may require the location detection system to determine the mobile display device relative a video camera meets a threshold requirement for each of or at least one of the two or more criteria before determining the proximity of the mobile display device relative to the video camera meets the predetermined criteria.

In some cases, the location detection system may determine the mobile display device meets predetermined proximity requirements for two or more video cameras. Additionally or alternatively, the location detection system may include an ability to select or determine a single video camera for which the mobile display device is determined to have met the predetermined proximity criteria when two or more video cameras have met the threshold criteria. In one example, if it is determined that the mobile display device meets threshold requirements of the predetermined proximity criteria for two or more video cameras, the location detection system may compare values of the proximity criteria for each of the two or more video cameras and select a video camera as being the video camera with a proximity of the mobile display device that best meets the predetermined proximity requirement based on the comparison, but this is not required.

In response to determining the mobile display device meets the predetermined proximity criteria with respect to one or more video cameras, video streams from the one or more cameras determined to meet the predetermined proximity criteria may be provided (e.g., wireless provided over one or more networks and/or otherwise provided in a suitable manner) to the mobile display device and displayed 206 on a display (e.g., the display 34 and/or other suitable display) of the mobile display device by a video management system (e.g., the video management system 14 and/or other suitable video management system). In some cases, if two or more video cameras are determined to meet the predetermined proximity criteria relative to the mobile display device, video streams from each of the video cameras that meet the predetermined proximity cameras may be provided to the mobile display device and the user of the mobile display device may decide to view the two or more video streams and/or may be able to select one of the provided two or more video streams to view.

Figure 7:
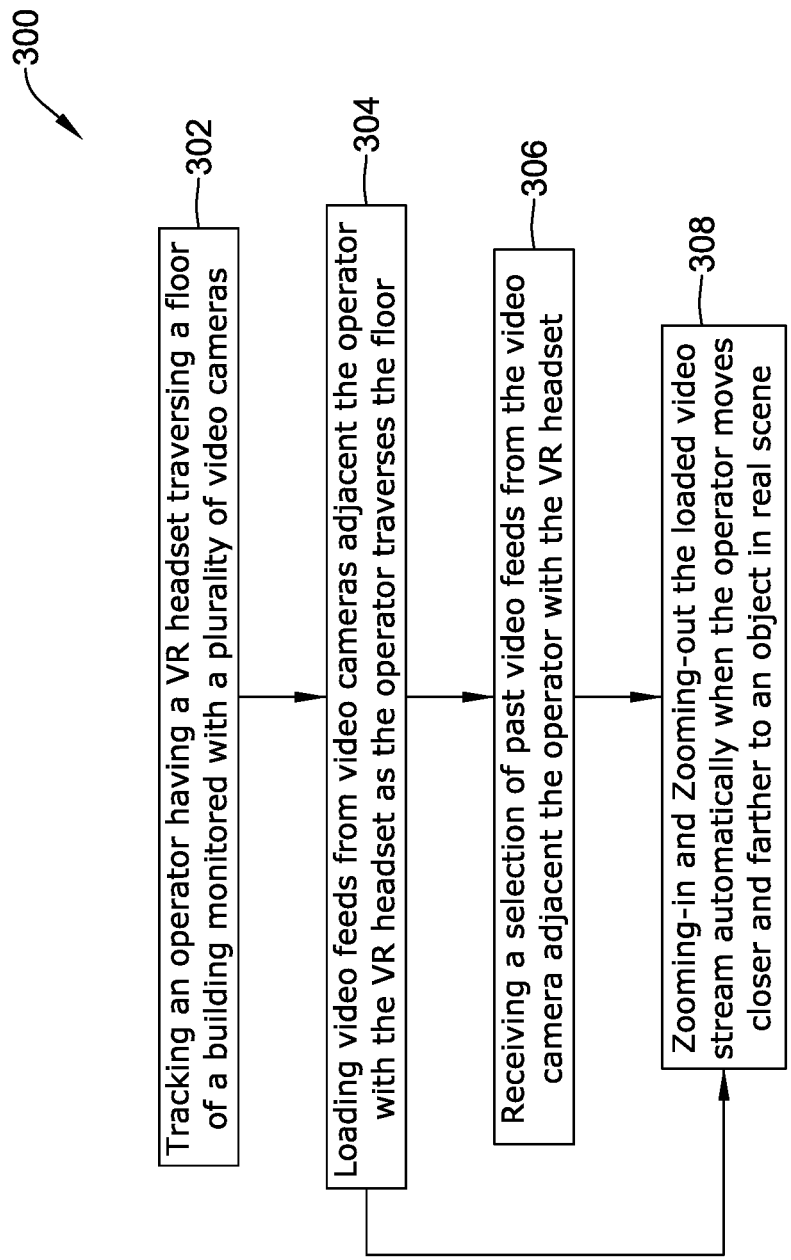
FIG. 7 is a schematic flow diagram of an illustrative method of providing a video stream to a virtual reality (VR) headset, where the video stream has been captured by a video camera that meets a predetermined proximity criteria relative to the VR headset.

FIG. 7 is a schematic flow diagram of an illustrative method 300 of providing a video stream to a virtual reality (VR) headset, where the video stream has been captured by video cameras (e.g., the cameras 12 and/or other suitable cameras) of a surveillance system (e.g., the surveillance system 10 and/or other suitable surveillance system). The VR headset may be a computing device (e.g., the computing device 24 and/or other suitable computing device) and may be a mobile display device (e.g., the mobile display device 18 and/or other suitable mobile display device) and/or the VR headset may be a carrier for the mobile display device (e.g., the VR headset may be configured to receive the mobile display for use in creating a VR environment).

In the illustrative method 300, an operator (e.g., the user 38 and/or other suitable operator) having the VR headset may traverse a floor of a building monitored with a plurality of video cameras and may be tracked 302 as the operator moves along the floor of the building. The operator having the VR headset may be tracked in any suitable manner including, but not limited to, via a location detection system (e.g., the location detection system 16 and/or other suitable location detection system) determining the operator's proximity and/or a proximity of the VR headset of the operator to one or more video cameras of the plurality of video cameras. In some cases, the operator may be tracked by detecting a proximity to the plurality of video cameras and determining when the proximity detected meets a predetermined proximity criteria in the manner discussed herein (e.g., see method 200 of FIG. 6), but this is not required.

As the operator traverses the floor with the VR headset, one or more video feeds from the cameras adjacent the operator with the VR headset may be loaded 304 or otherwise provided to and displayed on a display of the VR headset (e.g., a display of the mobile display device and/or other suitable display). Before or after video feeds or streams are loaded onto the VR headset, selection by the operator of past video feeds from the video camera adjacent the operator with the VR headset may be received 306. In response to receiving 306 the selection of past video feeds, the past video feed may be provided to and displayed on the VR headset in any suitable manner, including, but not limited to, the manners discussed herein.

Received selections of past video feeds may include receiving any suitable types of selections. In some cases, the received selections of past video feeds may include receiving a selection of a specific video feed, a selection of a particular date and/or time, etc. When selections of a particular date and/or time are received, the surveillance system may be configured to provide video feeds starting at or including the received date and/or time for each of the video cameras as the operator moves around the floor. In one example, as the operator with the VR headset moves around the floor from a first location to a second location, the video stream provided to the VR headset may automatically switch from displaying a video feed from a first video camera to a second video camera such that the second video feed starts at the selected date and time. In an additional or alternative example, as the operator with the VR headset moves around the floor from a first location to a second location, the video stream provided to the VR headset may automatically switch from displaying a video feed from a first video camera to a second video camera such that the second video feed starts at a date and/or time at which the first video feed was at when the video feed switched to the video feed from the second camera.

The selections of past video feeds may be made by the operator using the VR headset. In some cases, the user may select a past video feed or date and time for setting a selected time period for the video feed from a user interface of the VR headset (e.g., a display of the mobile display device and/or other suitable user interface associated with the VR headset).

As the video feed is provided to the VR headset and/or when the video feed is provided to the VR headset, a zoom level of the video feed may be adjusted 308 based on results of the tracking 302 of the operator having the VR headset. In one example, the video feed may include a displayed object (e.g., a door or other suitable displayed object) and when the operator and/or the VR headset moves in a direction of or in a direction away from the displayed object of an actual location on the floor, a zoom level of the video feed may be adjusted. In addition to or as an alternative to adjusting a zoom level of the video feed, an angle or other parameter of the video may be adjusted based on results of the tracking 302 of the operator having the VR headset. The surveillance system having the plurality of cameras may be configured to adjust the zoom level, the angle, and/or other parameter of the video feed, but other systems may be utilized.

In some cases, the tracking 302 of the operator and/or the VR headset may result in determining how far the operator and/or the VR headset are from a video camera associated with the VR headset and setting a zoom level for the video feed based on a distance between video camera associated with the video feed and the operator and/or the VR headset. Further, as the operator moves around the floor, the surveillance system may be configured to adjust the zoom level of the provided and displayed video feed as the operator moves closer to and/or farther away from the video camera associated with the video feed provided to the VR headset. The setting and/or adjusting of the zoom level of the provided and displayed video feed may be performed automatically (e.g., by the surveillance system and/or other suitable system), but this is not required.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

What is claimed is:

1. A method comprising:
   detecting a proximity of a mobile display device relative to a location of a first video camera of a surveillance system, wherein the mobile display device is configured to be carried by a user;
   determining when the proximity of the mobile display device relative to the location of the first video camera meets a predetermined proximity criteria;
   in response to determining that the proximity of the mobile display device relative to the location of the first video camera meets the predetermined proximity criteria, automatically identifying at least part of a video scene previously captured by the first video camera and previously recorded on a video recorder, and the mobile display device accessing from the video recorder the automatically identified at least part of a video scene previously captured by the first video camera and previously recorded on the video recorder and displaying at least part of the video scene previously captured by the first video camera on the mobile display device;
   detecting the proximity of the mobile display device relative to a location of a second video camera of the surveillance system;
   determining when the proximity of the mobile display device relative to the location of the first video camera no longer meets the predetermined proximity criteria and the proximity of the mobile display device relative to the location of the second video camera meets the predetermined proximity criteria, and in response, automatically identifying at least part of the video scene previously captured by the second video camera and previously recorded on the video recorder and switching to display at least part of the video scene previously captured by the second video camera on the mobile display device.

2. The method of claim 1, further comprising:
   automatically adjusting a zoom level of the video scene previously captured by the first video camera and displayed on the mobile display device in response to movement of the mobile display device relative to the first video camera.

3. The method of claim 1, further comprising:
   in response to determining that the proximity of the mobile display device relative to the first video camera meets the predetermined proximity criteria, displaying an option on the mobile display device that when selected by a user of the mobile display device is used in automatically identifying the at least part of the video scene previously captured by the first video camera and previously recorded on the video recorder that is then accessed and displayed by the mobile display device.

4. The method of claim 3, wherein the option on the mobile display device includes an option to select a past date and/or time of the video scene to display on the mobile display device.

5. The method of claim 1,
   wherein the proximity of the mobile display device relative to the location of the first video camera meets the predetermined proximity criteria when the proximity of the mobile display device is within a same room or space as the first video camera and is within a predetermined distance of the first video camera.

6. The method of claim 5, further comprising:
   wherein the proximity of the mobile display device relative to the location of the second video camera meets the predetermined proximity criteria when the proximity of the mobile display device is within a same room or space as the second video camera and is within the predetermined distance of the second video camera.

7. The method of claim 1, further comprising:
   receiving a selection of a date and time for the video scene captured by the first video camera;
   displaying, on the mobile display device, the video scene from the first video camera for the date and time selected; and
   wherein automatically switching to display the video scene captured by the second video camera includes starting the video scene captured by the second video camera at a time following the time selected for the video scene captured by the first video camera plus an elapsed time since the video scene captured by the first video camera was initially displayed on the mobile display device.

8. The method of claim 1, further comprising:
   detecting, via a location detection system, a room or space of the mobile display device; and
   wherein the proximity of the mobile display device relative to the location of the first video camera meets at least in part the predetermined proximity criteria when the proximity of the mobile display device is within the same room or space as the first video camera; and
   wherein the proximity of the mobile display device relative to the location of the second video camera meets at least in part the predetermined proximity criteria when the proximity of the mobile display device is within the same room or space as the second video camera.

9. A method of monitoring a surveillance system, comprising:
   capturing live video streams with a plurality of video cameras spaced from one another in a predetermined area;
   recording the live video streams captured by the plurality of video cameras on a video recorder;

receiving an indication that a mobile display device has a predetermined geo-location relative to a first video camera of the plurality of video cameras;

in response to receiving the indication that the mobile display device has the predetermined geo-location relative to the first video camera of the plurality of video cameras, automatically identifying a video scene previously captured by the first video camera and previously recorded on a video recorder;

providing the automatically identified video scene previously captured by the first video camera to the mobile display device for display on the mobile display device;

receiving an indication that the mobile display device has moved and now has the predetermined geo-location relative to a second video camera of the plurality of video cameras;

in response to receiving the indication that the mobile display device has the predetermined geo-location relative to the second video camera of the plurality of video cameras, automatically identifying a video scene previously captured by the second video camera and previously recorded on the video recorder; and providing the automatically identified video scene previously captured by the second video camera to the mobile display device for display on the mobile display device.

10. The method of claim 9, further comprising:

displaying an option on the mobile display device, wherein the option solicits a past time for the video scene to display on the mobile display device; and in response to receiving the indication that the mobile display device has the predetermined geo-location relative to the first video camera of the plurality of video cameras, providing the video scene previously captured by the first video camera and recorded on the video recorder that corresponds to the past time for display on the mobile display device.

11. The method of claim 9, further comprising:

establishing a communication link between the mobile display device and the video recorder, and providing the video scene previously captured by the first video camera and recorded on the video recorder to the mobile display device via the communication link.

12. The method of claim 11, wherein the communication link is a wireless communication link.

13. The method of claim 9, further comprising:

automatically adjusting a zoom level of the video scene for display on the mobile display device in response to movement of the mobile display device relative to the first video camera.

14. The method of claim 9, wherein the first video camera is a 360 degree video camera.

15. The method of claim 14, further comprising:

determining a facing direction of the mobile display device relative to the first video camera; and automatically adjusting a pan setting of the video scene for display on the mobile display device in response to the facing direction of the mobile display device relative to the first video camera.

* * * * *